United States Patent [19]
Brookman

[11] 4,043,171
[45] Aug. 23, 1977

[54] BRANCH TOOL

[75] Inventor: Anthony Haldane Ray Brookman, Wattle Park, Australia

[73] Assignee: Rast Patent Manufacturers Pty. Ltd., North Plympton, Australia

[21] Appl. No.: 694,477

[22] Filed: June 9, 1976

[30] Foreign Application Priority Data

June 13, 1975 Australia .............................. 1982/75

[51] Int. Cl.² ............................................. B21D 41/02
[52] U.S. Cl. ....................................................... 72/393
[58] Field of Search ................. 72/392, 393, 367, 370, 72/117; 29/282, 283, 252, 237; 269/48.1

[56] References Cited
U.S. PATENT DOCUMENTS

| 333,410 | 12/1885 | Hawkins | 72/117 |
| 1,372,197 | 3/1921 | Rudolph | 72/117 |
| 2,155,542 | 4/1939 | Graham | 72/393 |
| 2,507,859 | 5/1950 | Keller | 72/370 X |
| 2,999,529 | 9/1961 | Rast | 72/393 |

Primary Examiner—C.W. Lanham
Assistant Examiner—Gene P. Crosby
Attorney, Agent, or Firm—Oldham & Oldham Co.

[57] ABSTRACT

A method of forming a socket on a tube where a branch tube is to be joined to it, which consists of the steps of forming an aperture in the side of the tube which aperture is smaller than the internal dimension of the socket required, inserting expandible jaws into the aperture, placing a sliding former into contact with the tube around the jaws, and expanding the jaws while causing relative outward axial movement of the former in relation to the jaws.

8 Claims, 5 Drawing Figures

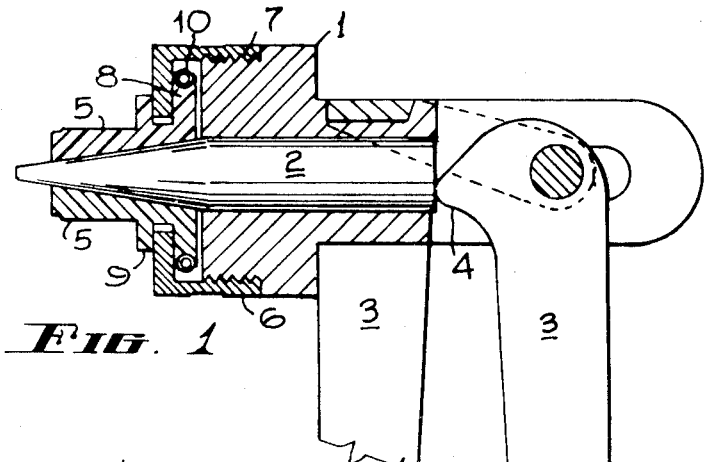
FIG. 1
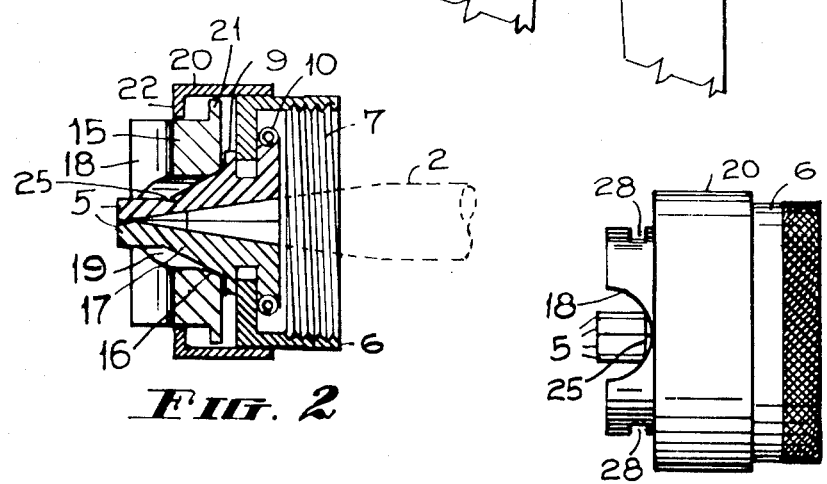
FIG. 2
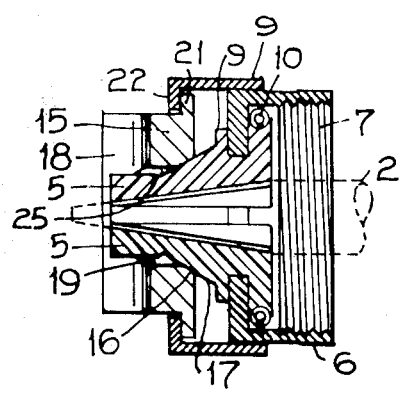
FIG. 3
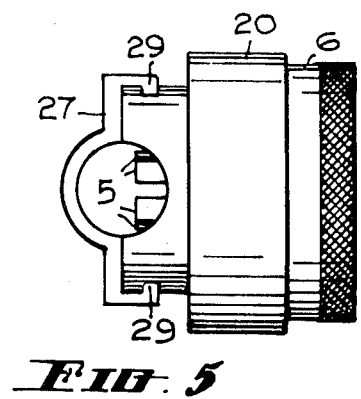
FIG. 4
FIG. 5

BRANCH TOOL

This invention relates to a branch tool.

In tube work for conveying fluids it is customary to braze or weld branches into the tubes where flow is to be divided or diverted or is to supply a number of points, and to achieve this it has been proposed heretofore to form an aperture in the wall of the tube where a branch is to be effected and to then use a tool which is inserted into the aperture and which expands the metal around the aperture into a socket into which a branch tube can then be inserted and brazed or otherwise rendered permanent.

With the forms of devices which have been used heretofore the tools have been of a relatively complicated nature because the part of the tube which does the expanding must of necessity be larger than the aperture when expansion is actually being effected, and also because of the problems of effecting expansion it has not been possible in the past to join a branch tube to a main tube line unless the branch was somewhat smaller than the main line.

It is already known to provide expanding tools for joining the main line tubes end to end, that is the expanding tool expands the end of one tube so that the end of the other tube can fit neatly into it and the joint can then be made permanent by flowing or bonding medium into the joint so formed or by brazing or welding.

The prior art expansion tools generally comprise a member having jaws which are forced apart in a radial direction by a tapered drift after inserting into the end of a tube to thereby expand a tube, and such expansion devices while suitable for expanding the ends of tubes, are not usable at the present time for the forming of the sockets into which a branch is to be fitted for the reason that the socket forming action requires not only expansion but a drawing action to draw the metal of the tube around the periphery of the hole outwardly to form the socket which engages the branch.

According to this invention however a somewhat similar tool can be used as the tool used for expanding the ends of tubes, but the device according to the present invention comprises a sliding former associated with radially expanding jaws in such a way that when the expanding jaws are inserted into a hole or aperture in the side of a tube, the sliding former engages the outer surface of the tube around the aperture and the action of forming the socket into which the branch tube can be placed is to push the sliding former forwardly in relation to the expanding jaws while holding the tube being formed on the jaws by friction or by circumferential grooves or other mechanisms, so that the action is to engage the jaws in the aperture in the side of the tube and to engage a sliding former on the outside of the tube and to then expand the jaws while causing the sliding former to move forwardly in relation to the jaws, which action then causes the jaws to expand the metal around the aperture, in the direction of the branch tube, to form a socket. A die can be engaged on the sliding former to prevent distortion of the tube near the socket as it is formed.

The method according to this invention of forming a socket on a tube where a branch tube is to be joined to it, comprises forming an aperture in the side of the tube which is of a smaller diameter than the internal dimension of the socket required, inserting expandible jaws into the aperture, placing a sliding former into contact with the tube around the jaws which is itself provided with an aperture larger than the circle of maximum expansion of the said jaws during a forming action, and expanding the jaws while causing relative axial movement of the former in relation to the jaws as the said jaws are expanded so as to draw metal surrounding the aperture outwardly from the tube to form the socket.

The device for achieving this comprises a series of jaws, a body to hold the jaws to be outwardly movable to expand the metal around an aperture in a tube positioned over the jaws, a former to engage the tube adjacent to the aperture, and means to simultaneously expand the jaws and move the former in axial relationship to the jaws to draw metal around the aperture outwardly from the tube.

In order however that the invention may be more fully appreciated, an embodiment thereof will now be described with reference to the accompanying drawings in which:

FIG. 1 is a view of a tube expander according to the prior art which was designed to expand the ends of tubes and which, according to this invention can have a replacement head applied to it which forms a branch tool by engaging on the jaws a sliding former which a moved forward as the jaws expand, FIG. 2 is a longitudinal section of the branch tool head forming the subject of this invention, with the jaws and sliding former in the retracted position, FIG. 3 is a section similar to FIG. 2 but showing the jaws expanded and the sliding former forwardly positioned as it would be on completion of the forming action, FIG. 4 is a plan of the head shown in FIG. 2, and FIG. 5 is a plan similar to FIG. 3 but showing the jaws expanded and the sliding former in its forward position and showing a die engaged on the sliding former to prevent distortion of the tube during drawing of the socket.

According to the construction shown the head comprises a body 1 which has in it an axially guided tapered drift 2 and has on it a pair of handles 3-3, one fixed to the body 1 and the other having a cam 4 to force the drift 2 forwardly within a set of circularly arranged expanding jaws 5. The jaws are carried by a jaw cap 6 joined to the body 1 by a screw thread 7 so that as the drift 2 is forced forwardly, the jaws 5 move radially outwardly, the jaws being held against axial movement in the flanged jaw cap 6 by having a rear flange 8 and a forward flange 9 so that the jaws are axially immovable but radially expandible when the drift 2 is moved into the jaws 5 to force them apart. A spring ring 10 urges the jaws 5 inwards on to the drift 2.

The known construction described is used also in the present invention and similar reference numerals are used in the construction according to the present invention as shown in FIGS. 2 to 5 which will now be referred to.

A sliding former 15 is provided with a taper 16 corresponding to a taper 17 on the jaws 5 behind the operative outward surfaces of the jaws which engage the tube to be formed, so that as the jaws expand, the sliding former 15 is forced forwardly in relation to the jaws 5 due to the interengaging tapers 16 and 17, the sliding former having a semi circular groove 18 to engage the tube being formed, a retaining cap 20 being used to hold the sliding former 15 in position in relation to the jaw cap 6 and the jaws 5 but allowing limited movement of the sliding former 15 within the retaining cap 20. The sliding former has an aperture 19 into which the socket is formed, the diameter of this aperture being larger than the circle of expansion of the jaws 5 so that the socket is formed between the sliding former 15 and the jaws 5. A flange 21 on the sliding former 15 co-acts with a flange 22 in the retaining cap to limit the movement of the sliding former 15.

In this way the sliding former 15 will be given a forward movement as the jaws 5 expand, and it will then be realized that friction of the outward surface of the jaws 5 when they commence expanding will cause the metal around the aperture in the tube to be drawn outwards by the jaws 5. The groove 25 ensures that slip does not take place between the jaws 5 and the metal of the tube around the aperture but other friction increasing means such as knurling or corrugatures could be used.

As the movement of the drift 2 is continued, the action is to force the metal around the aperture in the tube outwardly from the tube to form a socket into which the branch can then be fitted.

The branch will have its end shaped to fit the socket so that when it is placed into the socket, it can be engaged up to the centre line of the tube if such is desired and will not block the tube, the extend of engagement of course depending on the diameter of the branch tube which is to be affixed to the main tube line. A device to shape the end of the branch tube forms the subject of a co-pending patent.

Instead of simply resting the sliding former 15 against the tube to be branched, a rear support die 27 for the tube may be used which can form a relatively complete support around the outside of the tube being branched, so that during shaping of the aperture during withdrawal of the jaws out of the aperture with their simultaneous expansion, the tube will be maintained in a straight line and will thus be formed in a die giving relatively complete support to the outside of the tube being branched. Such a form is shown in FIG. 5.

It will be seen that the die 27 is engaged on the sliding former 15 by having transverse grooves 28 (FIG. 4) on the sliding former 15 into which ribs 29 of the die 27 are engaged so that a cylindrical hollow is formed between the sliding former 15 and the die 27. The die 27 can be removed to release the tube after it has been formed, the die 27 being simply moved axially in relation to the tube being formed. The die 27 together with the semi circular groove 18 forms a complete support for the tube so that only the metal around the edge of the aperture can be drawn out by relative movement between the jaws and the sliding former to form the socket.

Other forms of rear support could be used, such for instance as a half-tube of an internal dimension to fit neatly to the tube being branched, which could then be placed over the rear part of the tube being branched and held thereto by circlips engaging the sliding former to form with the former a complete die to maintain the tube being formed in a straight line and to prevent unwanted distortion at points which may occur particularly if the tube is being formed over one half of its circumference such as when joining to it a branch of approximately the same diameter as the tube which is being branched.

From the foregoing it will be realized that the device can conveniently comprise an attachment to a tube expanding tool by providing on the expanding tool a retaining cap which secures to the jaw cap and which holds the axially movable sliding former in relation to the jaws so that, as the jaws expand, the sliding former is moved forwardly in relation to the jaws to give the necessary socket-forming action.

The device need however not be an accessory for a tube expander as it can be made up as a complete unit either hand or power operated, the important feature of the invention being the expansion of the jaws at the same time as a sliding former which engages the tube is pushed forwardly as the jaws expand to achieve the required forming of the socket in an effective manner.

I claim:

1. A device for forming a socket in the side of an apertured tube where a branch tube is to be joined to it comprising, a series of circularly arranged jaws, a body to hold the said jaws to be outwardly movable to expand the metal around an aperture in a tube positioned over said jaws, a former to engage said tube adjacent to said aperture, said former being carried by said jaws by tapered interengaging surfaces therebetween, and means to simultaneously expand the said jaws in a substantially radial direction and move said former in axial relationship to said jaws to draw the wall of the tube surrounding said aperture outwardly from said tube to form the said socket.

2. A device according to claim 1 for forming a socket on the side of an apertured tube wherein the said former is apertured and is shaped to engage the said tube at least partway around the said aperture in the said tube, the said aperture in the said former being arranged about the said jaws and being larger than the perimeter to which the jaws are expanded when forming a socket, whereby as the said jaws are expanded they draw the wall of the tube surrounding the said aperture outwardly from the said tube to form the said socket.

3. A device according to claim 1 for forming a socket on the side of an apertured tube, wherein the said former is apertured to a dimension corresponding to the outer perimeter of the said socket, whereby the said former defines the shape of the said socket in conjunction with the said jaws.

4. A device according to claim 1 for forming a socket on the side of an apertured tube, wherein the said jaws are arranged to be moved radially outward to form a circular socket, and the said sliding former has a cylindrical aperture surrounding the said jaws and of a dimension to form a cylindrical socket in conjunction with the said jaws.

5. A device according to claim 1 for forming a socket on the side of an apertured tube wherein the said jaws are shaped to move the said former forward as the said jaws are expanded.

6. A device according to claim 1 for forming a socket on the side of an apertured tube wherein the said jaws have a taper on them which engages a taper on the said sliding former whereby the said former is moved forward on the said jaws as the said jaws are expanded.

7. A device according to claim 1 for forming a socket on the side of an apertured tube, wherein the said jaws are supported in a body, and the jaws have flanges to engage on the said body to permit radial but not axial movement of said jaws relative to said body, and wherein an axially moving tapered drift expands said jaws, said drift being axially moved by a handled pivoted to said body and having a cam engaging said drift.

8. A device for forming a socket on the side of an apertured tube characterised by a head comprising jaws and a flanged jaw cap and a sliding former, a series of such jaws being arranged about a central axis, said jaws having flanges engaging said flanged jaw cap to allow radial movement of said jaws about the said central axis but preventing axial movement of said jaws, the said jaws projecting from the said flanged jaw cap to be movable into the said aperture in the said tube, the said sliding former being apertured to engage a taper on the said projecting jaws arranged to move the sliding jaws forward when the said jaws are moved radially outwards, said sliding former having a forward face shaped to engage the said tube adjacent to the aperture in the said tube, said aperture in said sliding former being dimensioned to define the said socket with the said jaws, a body engaged by the said flanged jaw cap and supporting a tapered drift coaxial with the said jaws, and means to move the said drift into the said jaws to expand the said jaws and subsequently retract the tapered drift to allow the jaws to move toward said central axis, and means engaging the said jaws to urge the jaws inward toward the said axis.

* * * * *

UNITED STATES PATENT OFFICE
CERTIFICATE OF CORRECTION

PATENT NO. : 4,043,171
DATED : August 23, 1977
INVENTOR(S) : Anthony Haldane Ray Brookman It is certified that error appears in the above-identified patent and that said Letters Patent are hereby corrected as shown below:

Column 2, line 24, change "a" (last occurrence) to -- is --

Column 3, line 25, change "extend" to -- extent --

Signed and Sealed this

Thirteenth Day of December 1977

[SEAL]

Attest:

RUTH C. MASON
Attesting Officer

LUTRELLE F. PARKER
Acting Commissioner of Patents and Trademarks